UNITED STATES PATENT OFFICE.

JAMES H. OLIVER, OF BALTIMORE, MARYLAND.

IMPROVEMENT IN PRESERVING JUICES OF GREEN CORN.

Specification forming part of Letters Patent No. 200,150, dated February 12, 1878; application filed September 26, 1877.

*To all whom it may concern:*

Be it known that I, JAMES H. OLIVER, of the city of Baltimore and State of Maryland, have invented a Process for Preparing and Preserving the Milky Juices of Green Indian Corn, to be used as an article of food, of which the following is a specification:

This invention relates to the treatment of the milky juices of green corn by a combination of three processes, comprising, first, that for expressing the juices from the kernels; second, for preparing the juices thus expressed; third, for the preservation of the product thus prepared.

Expressing the Juices.

First, to obtain these juices I remove the kernels from the cob, crush and place them in a perforated metallic cylinder, and express the juices therefrom in like manner as cider is expressed from the pulp of apples. By this means the pure nutritious juices or liquid elements are separated from the pulp, hulls, and other solid and indigestible parts of the corn. Thus obtained, these juices present the appearance and liquid consistency of milk fresh from the cow; but if allowed to remain undisturbed, certain changes among the particles soon follow, and the distinctive properties of the liquid are rapidly and totally dissipated by decomposition.

Preparation of the Juices.

Second, to prevent these changes, and prepare the juices for preservation, I place the recently-expressed liquid in an open vessel, apply heat, and stir until it is cooked, or is reduced to the consistency of sirup. By the action of heat thus applied the tendency toward decomposition is overcome, and the elements are merged into a homogeneous mass, in which the flavor and other distinctive properties of the green corn remain unimpaired.

Preservation of the Product.

Third, to preserve the product of the juices thus prepared, I place the mass in hermetically-sealed cans, and subject the cans to the usual process.

By the processes thus completed, a highly nutritious and exceedingly delicate article of diet, possessing the flavor and other desirable properties of the green corn, is secured for future use; and commerce is supplied with a new and valuable article of manufacture, divested of the grosser parts, and containing all the nutritious elements of the green corn condensed into a space less than one-sixth of that occupied by it as prepared by any other process.

The material thus preserved may be eaten cold, or recooked separately or in combination with other articles of food, to which its delicious and popular flavor is imparted.

While I disclaim any originality as to either of the processes used in my process, as described, considered abstractly, I claim that by the use of the three jointly I have perfected a new and improved process essential in all its divisions to the purpose to which it is applied, and by means of which I prepare, in a concentrated or condensed form, a new and valuable article of manufacture, composed of the liquid juices of the green corn, and preserve it in cans for future use.

Having thus described my invention, I claim—

1. An improved process for treating the juices of green corn for preservation as an article of food, consisting in the separation of the juices from the pulp and hulls, the preparation of said juices by agitating and cooking them, and in the preservation of the product thus prepared in hermetically-sealed cans, substantially as described.

2. A new article of manufacture—the pure concentrated juices of green corn hermetically sealed up in tight cans for future use as food, substantially as hereinbefore set forth.

JAS. H. OLIVER.

Witnesses:
E. T. BOWEN,
CHAS. H. POOLE.